United States Patent [19]

Iovine et al.

[11] Patent Number: 4,668,730
[45] Date of Patent: May 26, 1987

[54] COLLOID STABILIZED LATEX ADHESIVES

[75] Inventors: Carmine P. Iovine, Bridgewater; Yen-Jer Shih, Somerset; Paul B. Foreman, Somerville, all of N.J.

[73] Assignee: National Starch and Chemical Corp., Bridgewater, N.J.

[21] Appl. No.: 762,651

[22] Filed: Aug. 5, 1985

[51] Int. Cl.$^4$ .............................................. C08F 2/16
[52] U.S. Cl. .................................. 524/460; 427/208.4; 428/511; 428/514; 428/516; 526/201; 526/203
[58] Field of Search ............... 524/460; 526/201, 203; 428/511, 514, 516

[56] References Cited

U.S. PATENT DOCUMENTS

| | | | |
|---|---|---|---|
| 3,308,078 | 3/1967 | Rogers et al. | 260/27 |
| 3,673,142 | 6/1972 | Saunders et al. | 269/29.6 |
| 4,136,830 | 2/1982 | Mallon | 260/29.6 |
| 4,442,258 | 4/1984 | Sunakawa et al. | 524/767 |
| 4,460,732 | 7/1984 | Buscall et al. | 524/460 |
| 4,465,803 | 8/1984 | Nakayama | 524/460 |

FOREIGN PATENT DOCUMENTS

| | | | |
|---|---|---|---|
| 0878572 | 8/1971 | Canada | 524/460 |
| 8103333 | 11/1981 | European Pat. Off. | 526/201 |
| 2734801 | 2/1978 | Fed. Rep. of Germany | 524/460 |
| 6109201 | 8/1981 | Japan | 524/460 |
| 0092013 | 6/1982 | Japan | 526/203 |
| 1107249 | 3/1968 | United Kingdom . | |

*Primary Examiner*—Joseph L. Schofer
*Assistant Examiner*—J. M. Reddick
*Attorney, Agent, or Firm*—Ellen T. Dec; Edwin M. Szala

[57] ABSTRACT

Latex adhesives having a Tg of $-60°$ to $0°$ C. characterized by superior rheological properties, are prepared without the use of additional thickeners from a colloid stabilized latex comprising: 65-90% by weight of the latex polymer solids of an acrylate or methacrylate ester monomer polymerized in 10-35% by weight of the latex solids of a polymeric colloid, the polymeric colloid having a Tg of $-40°$ to $0°$ C., a number average molecular weight of 2,000 to 10,000 and comprising
(a) 50 to 85% by weight of a monomer of the formula:

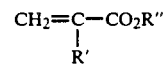

where R' is hydrogen or methyl and R" is a $C_1$-$C_{12}$ straight or branched chain alkyl group;
(b) 10 to 50% by weight of an ethylenically unsaturated mono- or dicarboxylic acid;
(c) 5 to 30% by weight of an acrylic or methacrylic ester of a polyalkylene oxide, and
(d) 0 to 30% by weight of another ethylenically unsaturated copolymerizable monomer.

15 Claims, No Drawings

COLLOID STABILIZED LATEX ADHESIVES

BACKGROUND OF THE INVENTION

This invention relates to colloid stabilized latices which are useful as pressure sensitive adhesives or as laminating adhesives.

The replacement of solvent borne adhesives with aqueous latices is a continuing trend in industry for reasons of air quality, safety, and economics. However, the transition has not been simple and is by no means complete. Aqueous adhesives have found limited acceptance, being regarded as generally inferior to organic solution adhesives either in performance or coating rheology or both. The poor coating rheology typical of conventional latex adhesives is manifested in several forms: first, there is a tendency in roll application to form ridges parallel to the direction of coating. Ridges adversely effect adhesive performance by reducing the effective area of contact with the secondary substrate during bonding, but more importantly they substantially detract from the appearance of a lamination particularly when a clear film is used. Even if the primary substrate is opaque, ridges in the underlying adhesive may prevent subsequent satisfactory printing on a label or decal for example. A second rheological deficiency of conventional latices is their tendency to exhibit a decrease in viscosity at the shear rates encountered in high speed coating operations, leading to poor substrate wetting, reduction in coating weight, and requiring a reduced line speed with attendant loss of productivity.

An additional deficiency of latex adhesives is the tendency for coagulum to build up on the metering roll when conventional emulsions are applied by a reverse roll coater. Such coagulum may arise either from poor mechanical stability under shear or from imperfect doctoring leading to a thin coating on the roll which dries and cannot be redispersed so that these particles eventually transfer to the applicator roll and mar the appearance of the coating.

The rheological defects of latex pressure sensitive adhesives prepared with conventional surfactants arise at least in part from the need to incorporate thickeners such as hydroxyalkyl cellulose or polyacrylic acid. Without thickening, the low viscosity conventional latex will not completely wet a silicone coated release liner. This is a prerequisite for coating employing the transfer method which is generally preferred particularly for heat sensitive face stocks. Even for direct coated self-wound tapes, thickening may be required depending on the nature of the coater and the porosity of the substrate.

In the particular case where the adhesive is to be used to form laminates wherein at least one of the surfaces is a printed surface, the presence of any residual surfactant can lead to discoloration or bleeding of the ink. This is recognizably a problem in applications such as over-laminating of books or printed labels where the purpose of the outer surfacing film is to preserve the integrity of the printed surface. It is also known that the presence of surfactant reduces the wet bond strength and water resistance of the laminate.

SUMMARY OF THE INVENTION

We have now found that a coatable latex adhesive having a Tg of $-60°$ to $0°$ C., characterized by superior rheological properties, can be prepared without the use of additional thickeners from a colloid stabilized latex comprising: 65–90% by weight of the latex polymer solids of an acrylate or methacrylate ester monomer polymerized in 10–35% by weight of the latex solids of a polymeric colloid, the polymeric colloid having a Tg of $-40°$ to $0°$ C., a number average molecular weight of 2,000 to 10,000 and comprising (a) 50 to 85% by weight of a monomer of the formula:

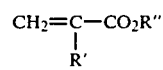

where R' is hydrogen or methyl and R'' is a $C_1$–$C_{12}$ straight or branched chain alkyl group;

(b) 10–50% by weight of an ethylenically unsaturated mono- or dicarboxylic acid;

(c) 5 to 30% by weight of an acrylic or methacrylic ester of a polyalkylene oxide, and (d) 0 to 30% by weight of another ethylenically unsaturated copolymerizable monomer.

The surfactant-free adhesives disclosed herein are prepared in two steps. In the first step the polymeric colloid is prepared by solution polymerizing the acrylate or methacrylate monomer with the acidic monomer, the ester of polyalkylene oxide, and optional vinyl polymerizable monomer in a solvent or solvent-water mixture to form a low molecular weight, alkali-soluble polymer. The solution polymer is then neutralized with a fugitive alkali (e.g., aqueous ammonium hydroxide) to give a water-soluble polymer salt. In the second step the water soluble colloid polymer salt is then used as the emulsifier of the "discontinuous phase" in the preparation of the acrylate-containing emulsion adhesive polymer. The viscosity of the resultant adhesive latex can be controlled by a combination of colloid level, composition and molecular weight.

The adhesive coatings are characterized by superior rheological properties with the formation of ridges either eliminated or dramatically reduced compared with conventional emulsions. The coatings, when transferred to a clear film and laminated, show exceptional gloss, depth of color and distinctness of image with little or no ink bleeding on printed surfaces. Not only does the adhesive character of the colloid improve the adhesion of the latex adhesive, but, the presence of a relatively large amount of colloid in the adhesive also imparts exceptional mechanical stability and assists in redispersing any partially dried emulsion. A still further advantage of the present invention is the improvement in water and humidity resistance which results from the absence of surfactants.

DETAILED DESCRIPTION OF THE PREFERRED EMBODIMENTS

Any acrylate or methacrylate monomers containing up to 12 carbon atoms in the alkyl chain may be used in preparing the polymeric colloid. Representative of such monomers are the methyl, ethyl, butyl, 2-ethylhexyl, octyl, decyl, dodecyl acrylate or methacrylates. Preferable monomers for use herein are butyl acrylate and/or 2-ethylhexylacrylate. This component is generally present in a amount of 50–85% by weight, preferably 60 to 80% by weight, of the total polymeric colloid.

Also required in the polymeric colloid is 10 to 50% by weight of an ethylenically unsaturated mono- or dicarboxylic acid. Examples of suitable acids include the monocarboxylic ethylenically unsaturated acids such as acrylic, methacrylic, vinyl acetic, crotonic, etc.; and the dicarboxylic ethylenically unsaturated acids such as maleic, fumaric, itaconic, etc.

The polyalkylene oxide ester utilized in forming the polymeric colloids includes the acrylic or methacrylic esters of polyalkylene oxide such as polyethylene or polypropylene glycol acrylate or methacrylate.

Optional comonomers include any which are polymerizable with the ester and acrylic or methacrylate acid monomers and include, for example, hydroxyalkyl acrylates or methacrylates, acrylamide, methacrylamide and their N-substituted derivatives.

The colloid is prepared by solution polymerization in the presence of alcohol, and an effective amount of initiator and chain transfer agent. The resultant polymeric colloid has a number average molecular weight of 2000 to 10,000, preferably 2500 to 4000, and itself has adhesive characteristics (being characterized by a theoretical glass transition temperature [Tg] of about $-40°$ to $0°$ C.).

The acrylate and/or methacrylate monomers used to provide the discontinuous phase in the latex adhesive polymer are those of the formula:

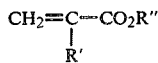

where R' is hydrogen or methyl and R" is a $C_1$-$C_{12}$ straight or branched chain alkyl group. While there is no necessity for the ester monomer of this phase to be identical to that used in the preparation of the colloid, butyl acrylate and 2-ethylhexyl acrylate are again the preferred monomers.

These monomers may represent the entire portion of this phase of the reaction or, some of this phase may be comprised of other copolymerizable comonomers including vinyl polymerizable monomers such as esters of (meth)acrylic acid with $C_1$-$C_{18}$ alcohols, including $C_1$-$C_{18}$ alkanols, benzyl alcohol, cyclohexyl alcohol, and isobornyl alcohol, such as acrylic, methacrylic, itaconic, maleic acids; methyl, ethyl, butyl, 2-ethylhexyl, or octadecylacrylate; unsaturated carboxylic acids such as (meth)acrylamide and their N substituted derivatives, such as N-mono and N-dimethyl, -ethyl, -propyl, and -butyl acrylamide or methacrylamide and N-mono or diphenylacrylamide; vinyl ethers such as butyl vinyl ether; N-vinyl lactams such as N-vinyl pyrrolidinone; halogenated vinyl compounds such as vinyl chloride and vinylidene chloride or fluoride; alkyl vinyl ketones such as methyl or ethyl vinyl ketone; diesters such as dimethyl, diethyl, dipropyl, dibutyl, diphenyl, dibenzyl, and di(phenylethyl) itaconate, maleate, and fumarate; and polyethyleneglycol acrylate or methacrylate or polypropyleneglycol acrylate or methacrylate. The amount of the optional comonomers used will depend on the Tg of the particular monomer as well as the intended end use of the adhesive. Generally, these optional monomers are used in amounts less than about 30% of the solids of the discontinuous phase of the reaction.

Also useful herein are minor amounts (e.g., 0.01 to about 2%) of multifunctional monomers which will serve to crosslink and thereby improve the cohesive properties of the resultant adhesives. Representative of suitable crosslinkers are multifunctional comonomers containing a multiplicity of ethylenically unsaturated units per molecule such as diallyl maleate, triallyl cyanurate, tetraethylene glycol dimethacrylate, hexa-allyl sucrose, etc.

The choice and amounts of the monomers used in producing both the polymeric colloid and the latex adhesive are, in large part, governed by the end use requirements of the adhesive. Those skilled in the art will recognize that a latex adhesive intended for use as a pressure sensitive where the dried coated surface remains in contact with a non-adhering surface for later use, will be formulated using softer comonomers, i.e., those with lower glass transition temperatures so as to produce a final adhesive having a theoretical Tg range of about $-60°$ to $-20°$ C. In contrast, the comonomers to be used with latices intended for direct, in-line laminating are higher Tg, harder monomers which produce adhesives which may have Tg's as high as about $0°$ C. Further, with respect to formulating the adhesive compositions, there is no direct correlation between the monomers used or final Tg of the colloid and those employed in the discontinuous phase; however, it has been observed that the best results are obtained when the polymeric colloid for use in a pressure sensitive adhesive has a relatively low Tg, i.e., in the range of about $-40°$ to $-20°$ C. while the colloids for use in laminating adhesives are preferably within a Tg range of $-25°$ to $10°$ C.

To prepare the adhesive latex, the acrylate monomer and any optional comonomers are interpolymerized in an aqueous medium in the presence of a catalyst, and the polymeric colloid, the aqueous system being maintained by a suitable buffering agent, if necessary, at a pH of 8 to 10. The polymerization is performed at conventional temperatures from about 20° to 100° C., preferably from 50° to 85° C., for sufficient time to achieve a low monomer content, e.g., from 1 to about 9 hours, preferably from 3 to about 7 hours, to produce a latex having less than 1.5 percent preferably less than 0.5 weight percent free monomer. Conventional batch, semicontinuous or continuous polymerization procedures may be employed.

One of the primary advantages of the present invention is the fact that the colloid can be used as the sole emulsifier to produce the acrylate containing emulsion. However, it will be recognized by those skilled in the art that small amounts of other surfactants or other protective colloids may be used in the preparation of the adhesive without departing from the spirit of the invention.

The polymerization is initiated by a water soluble free radical initiator such as water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxalate, potassium metabisulfite, sodium pyrosulfite, etc. The amount of reducing agent which can be employed throughout the copolymerization generally varies from about 0.1 to 3 weight percent of the amount of polymer.

The adhesive latices are produced and used at relatively high solid contents, e.g., between 35 and 70%, although they may be diluted with water if desired. The preferred latices contain about 40 to 60 weight percent solids.

In addition to the components described above, additives which are conventionally used in pressure sensitive or laminating adhesives may also be included herein. Such additives include, for example, defoamers, pH controlling agents, salts, humectants, etc. These additives, if used, are present in conventional amounts well known to those skilled in the art. In formulating the actual adhesives, it may also be desirable to post-add small amounts (i.e. less that about 5%) of conventionally employed external cross-linking agents such as the polyaziridines; epoxies; aminoplasts such as melamine formaldehyde resins; metal salts or oxides such as zinc oxide or zirconium ammonium carbonate; etc.

The following examples will more fully illustrate the embodiments herein. In the examples, all parts are given by weight and all temperatures are in degrees Celsius unless otherwise noted.

Brookfield viscosities (20 RPM) are measured at the indicated solids, and intrinsic viscosities (I.V.) are determined in dimethyl formamide at 30° C.

Deionized water was used in the preparation of the solutions and emulsions used for the polymerization.

The Williams plasticity (PN) is determined as follows for the resulting adhesives. A wet film of the adhesive is coated on silicone release paper so as to produce a dry film. It is dried at room temperature and further dried 5 minutes at 135° C. in a circulating air oven. The adhesive is removed from the silicone paper and a pellet exactly 2 grams in weight is formed in the shape of a ball. The sample ball is placed between two silicone coated papers and conditioned for 20 minutes at 37.8° C.

The Williams plasticity (PN) is the thickness of the pellet in millimeters after 14 minutes compression at 37.8° C. in the plastometer under a 5 kg load.

The test procedure used to evaluate the performance of the pressure sensitive adhesives herein include standard tests developed by the Specifications and Technical Committee of the Pressure Sensitive Tape Council in Glenview, Ill. The shear adhesion (holding power) test (PSTC-7) is described at p. 30, of the 7th edition of Test Methods for Pressure Sensitive Tapes 1976) modified to use a 2 kg per square inch load. The peel adhesion test for single coated tapes 180° angle (PSTC-1) is described at pp. 22 modified to allow 20 minutes or 24 hours contact of the adhesive with the test panel.

Tack is measured either subjectively by touch or quantitatively by means of a loop tack tester (Testing Machines, Inc., Amityville, N.Y.). The latter records the force, measured in ounces, to remove a one-inch by five-inch adhesive coated test strip, formed in the shape of a loop, from a stainless steel surface having one square inch of contact.

For all pressure sensitive testing, the adhesive was transfer coated on 2-mil polyester film, at a dried film deposition level of 16–18 pounds per 3000 square feet.

EXAMPLE 1

This example describes the preparation of a typical alkali soluble colloid which was used as an emulsifier for the subsequent emulsion polymerization of the adhesives of the invention. The reactor was equipped with a thermometer, agitator, addition funnel, and Dean Stark trap for vacuum stripping. The following charges were prepared.

A—56.7 parts n-propanol
B—3 parts n-propanol and 2 parts t-butyl peroctoate
C—35.5 parts butyl acrylate, 35.5 parts 2-ethylhexyl acrylate, 14 parts acrylic acid, 15 parts polyethylene glycol methacrylate containing 7–9 moles of ethylene oxide and 0.2 part mercaptoethanol
D—1.5 parts n-propanol and 3 parts t-butyl peroctoate
E—64 parts water and 13 parts (28%) ammonia.

The initial charge A was added to the flask and was heated to reflux. "B" was added and heated to reflux again. Five minutes later, C and D were added over 5 hours and 5 hours 10 minutes respectively. The mixture was maintained at reflux for another hour. Then 38.2 parts of n-propanol was vacuum stripped at 75° C. The mixture was cooled to 60° C. and E was added over 45 minutes. The mixture was held for another 45 minutes, cooled and discharged. The resulting solution polymer had a Brookfield viscosity of 950 cps at 50% solids, 2760 number average molecular weight, a Tg of −32° C. and 0.15 I.V. in water.

EXAMPLE 2

This example describes the preparation of the colloid stabilized pressure sensitive adhesive latex. A reactor with four-neck flask was fitted with a thermometer, condenser, agitator, subsurface nitrogen purge, and suitable addition funnels. The following charges were prepared.

A—110 parts water, 40 parts of the colloid solution of Example 1
B—2 parts butylacrylate, 3 parts methyl methacrylate, and 0.27 part t-butylhydrogen peroxide
C—1 part water and 0.027 part sodium metabisulfite
D—80 parts 2-ethylhexylacrylate, 13 parts methyl methacrylate, 0.4 part tetraethylene glycol diacrylate, 2 parts polyethylene glycol methacrylate, and 0.1 part t-butylhydrogen peroxide
E—8.7 parts water, 0.27 part sodium metabisulfite, and 1.3 parts 28% ammonia.

The initial charge A was adjusted to pH 9.5 by ammonia and added to the flask and the mixture was purged subsurface with nitrogen for 1 hour. Agitation was started and the monomer mixture B was added at 60° C. Mixture C was added at 60°–65° C., and was heated to the reaction temperature of 75° C. Five minutes later, charge E was slow-added over 4.75 hours, and 20 minutes after the slow-add E, charge D was slow-added over 4 hours. The batch was then held for 30 minutes at 75° C., cooled and discharged.

The resulting latex had a Brookfield viscosity of 635 cps at 45.5% solids and a Tg of −48° C.

The above latex (220 g) then was blended with 1.0 gm of polyaziridine (CX-100 from Polyvinyl Chemical Industries, Wilmington, Mass.). The resulting dried film had the following adhesive properties: 3.0 lb/in of peel adhesion after 20 minutes, 2.9 lb/in of peel after 24 hours, 59 oz loop tack, and 1.0 hour shear adhesion. Without polyaziridine, the dried film of the latex had the following adhesive properties: 3.7 lb/in of peel adhesion after 20 minutes, 3.8 lb/in of peel adhesion after 24 hours, 80 oz loop tack, and 0.1 hour shear adhesion. The films also exhibited 3.3 lb/in and 2.8 lb/in of peel adhesion after aging in a 100° F./100% RH chamber for 24 hours with or without addition of the polyaziridine, respectively.

Similar adhesives were prepared using polymeric colloids containing 5 and 10 parts of the polyethylene glycol methacrylate and having an I.V. of 0.12 dl/g and 0.125 dl/g respectively.

EXAMPLE 3

This example describes the preparation of the alkali soluble colloid which is used as an emulsifier for the emulsion polymerization in the laminating adhesive application.

The recipe was the same as in Example 1, except 23 parts of n-propanol were used in A; 10 parts butyl acrylate, 10 parts of methyl methacrylate, and 51 parts of 2-ethylhexyl acrylate were used in C instead of 35.5 parts butyl acrylate and 35.5 parts 2-ethylhexyl acrylate; and no n-propanol was used in D. The resulting colloid had 49.4% solids, 3170 cps in viscosity and 0.15 dl/g in I.V. (water) and a Tg of −19° C.

EXAMPLE 4

This example describes the preparation of the colloid stabilized emulsion latex and its application in a laminating adhesive.

The recipe was the same as in Example 2, except 48 parts of Example 3 colloid were used in A; 61 parts of 2-ethylhexyl acrylate and 32 parts of methyl methacrylate were used in D instead of 80 parts of 2-ethylhexyl acrylate, and 13 parts of methyl methacrylate. The resulting latex had 46.2% solids, 180 cps in viscosity, 0.016% grit, 2.0 mm PN and a Tg of −33° C.

100 grams of latex was diluted to 40% solids with 15 grams of water and compounded with 3% calculated on latex solids, of polyfunctional aziridine. The mixture was applied by Meyer rod to corona treated, oriented polypropylene film (680 IG from Mobil Chemical Co.) and dried to give a deposition of 8 grams/sq. meter. The coated film was then laminated to printed paper board using a 60° C. nip roll.

The 180° peel strength of the lamination was measured in a tensile test machine. Initially the bond strength was 400 grams/inch width and after one week a film tearing bond developed. The lamination possessed excellent gloss and depth of color, and could hold a textured embossing after only 5 hours cure.

EXAMPLE 5

This example describes the preparation of the colloid at higher acid content than the previous examples. The process of making the colloid is the same as in Example 1 but different in the composition. The following charges were prepared.

A—20 parts n-propanol
B—3 parts n-propanol and 2 parts t-butyl peroctoate.
C—60 parts 2-ethylhexyl acrylate, 21 parts acrylic acid, 15 parts polyethylene glycol methacrylate, 4 parts 2-hydroxethyl acrylate, and 0.2 part 2-mecaptoethanol.
D—3 parts t-butyl peroctoate.
E—64 parts water and 13 parts (28%) ammonia.

The resulting colloid had a viscosity of 3800 cps. at 51.3% solids and a calculated Tg of −27° C.

EXAMPLE 6

This example describes the preparation of the colloid stabilized emulsion with the colloid of Example 5. The recipe was the same as Example 2 except 58.3 parts colloid solution was used in A; 12 parts methyl methacrylate, 3 parts hydroxypropyl methacrylate, and 0.02 part tetraethylene glycol were used in D instead of 13 parts of methyl methacrylate and 0.4 part of tetraethylene glycol diacrylate; E contained 7.6 parts water and 1.3 parts ammonia. The resulting latex had 1150 cps at 46% solids and 0.001% grit and a calculated Tg of −45° C.

The blending of this latex with 1.5% (calculated on latex solids) of melamine formaldehyde resin (Cymel 325 from American Cyanamid Corp.) gave the following dried film pressure sensitive properties. The adhesive had 1.6 mm PN, 3.6 lb/in peel adhesion after 20 minutes, 5.0 lb/in peel adhesion after 24 hours, 1.4 hours shear adhesion, and 52 oz loop tack.

EXAMPLE 7

(Comparative)

This example describes the necessity for the use of a polyalkylene oxide acrylate or methacrylate ester in the polymeric colloid. The procedure and composition of Example 3 was repeated except C comprised 66 parts butyl acrylate, 34 parts acrylic acid and 0.2 parts mercaptoethanol. The colloid had a Tg of −19° C., 52.45% solids and 2360 cps viscosity.

The colloid was then used to prepare an adhesive using the charges of Example 4 but replacing D with 2 parts butyl acrylate, 34 parts methyl methacrylate and 61 parts 2-ethylhexylacrylate. The resulting latex had 45.8% solids, and 1150 cps viscosity. The calculated Tg was −33° C., the same Tg as the latex adhesive of Example 4.

When compounded and coated according to the method of Example 4, the dried film was observed to have no tack. When the coated film was laminated at 60° C. to printed board stock, the initial peel strength was 60 grams/inch width. After one week the peel strength had increased to only 140 grams/inch width. Such low green strength is insufficient to permit in-line slitting on a sheet fed laminator, and the final bond strength is insufficient to ensure the integrity of the lamination in use.

EXAMPLE 8

(Comparative)

This example describes the necessity for the use of a colloid having a relatively low Tg.

The recipe for the colloid preparation was the same as in Example 1, except 213 parts of iso-propanol was used in A instead of 56.7 parts of n-propanol; 43 parts of butyl acrylate, 43 parts of methyl methacrylate were used in C instead of 35.5 parts of butyl acrylate, 35.5 parts of 2-ethylhexyl acrylate, 15 parts of polyethylene glycol methacrylate and 0.2 parts mecaptoethanol. The resulting colloid had a Tg of 47° C.

The preparation of the colloid stabilized emulsion was the same as in Example 2, except 115.4 parts of water, and 66 parts of colloid were used in A; 15 parts of methyl methacrylate was used in D instead of 13 parts of methyl methacrylate, 0.4 part of tetraethylene glycol methacrylate, and 2 parts of polyethylene glycol methacrylate. The resulting latex had 45.5% solids. While the calculated Tg of the latex was −33° C., films of the latex had very low subjective tack and were not suitable for use as an adhesive.

EXAMPLE 9

(Comparative)

This example illustrates the use of Joncryl 678, a styrene/acrylate alkali soluble polymer having a Tg of 85° C. and available from S. C. Johnson Co..

The Joncryl 678 was used to prepare a colloid stabilized emulsion as follows:

A—131 parts of a 22.9% solution of Joncryl 678 and 0.23 parts of sodium persulfate B—2 parts butyl acrylate, 3 parts methyl methacrylate C—80 parts 2-ethylhexyl acrylate, 13 parts methyl methacrylate, 0.4 part tetraethylene glycol diacrylate, 2 parts polyethylene glycol methacrylate D—8.7 parts water, 0.45 parts sodium persulfate, and 1.3 parts 28% ammonia.

The initial charge A was adjusted to pH 9.5 with ammonia and added to the flask and the mixture purged subsurface with nitrogen for 30 minutes. Agitation was started and the monomer mixture B was added. When the temperature reached 75° C., charges C and D were slow-added over a four-hour period. The batch was then held for 30 minutes at 75° C., cooled and discharged.

The resulting latex contained 52.4% solids and viscosity of 520 cps. While the final latex had a Tg of −30° C., the latex film had very low subjective tack and was not suitable for use as an adhesive.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A latex adhesive composition having a Tg of −60 to 0 C. comprising 65 to 90% by weight of the latex solids of a discontinuous phase of an acrylate or methacrylate ester monomer polymerized in 10 to 35% by weight of the latex solids of a polymeric colloid, the polymeric colloid having a Tg of −40 to 0 C., a number of average molecular weight of 2,000 to 10,000 and consisting essentially of:

(a) 50 to 85% by weight of a monomer of the formula:

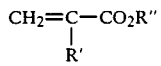

where R' is hydrogen or methyl and R" is a $C_1$-$C_{12}$ straight or branched chain alkyl group;

(b) 10 to 50% by weight of an ethylenically unsaturated mono- or dicarboxylic acid;

(c) 5 to 30% by weight of an acrylic or methacrylic ester of a polyalkylene oxide; and (d) 0 to 30% by weight of another ethylenically unsaturated copolymerizable monomer selected from the group consisting of hydroxyalkyl acrylates or methacrylates; acrylamide, methyacrylamide and their N-substituted derivatives; with the proviso that components a-d total 100% by weight.

2. The adhesive of claim 1 wherein the acrylate or methacrylate monomer used in the polymeric colloid is selected from the group consisting of the methyl, ethyl, butyl, 2-ethylhexyl, octyl, decyl, dodecyl acrylate or corresponding methacrylates.

3. The adhesive of claim 2 wherein the acrylate monomer is butyl acrylate or 2-ethylhexyl acrylate.

4. The adhesive of claim 1 wherein the acrylate or methacrylate monomer used in the colloid is present in an amount of 60 to 80% by weight of the solids of the colloid.

5. The adhesive of claim 1 wherein the colloid contains acrylic or methacrylic acid.

6. The adhesive of claim 1 wherein the colloid contains polyethylene glycol methacrylate.

7. The adhesive of claim 1 wherein the colloid contains an ethylenically unsaturated copolymerizable monomer selected from the group consisting of hydroxyalkyl acrylates or methacrylates; acrylamide, methacrylamide and their N-substituted derivatives.

8. The adhesive of claim 1 wherein the acrylate or methacrylate comonomer of the discontinuous phase is selected from the group consisting of the methyl, ethyl, butyl, 2-ethylhexyl, octyl, decyl, dodecyl acrylate or corresponding methacrylates.

9. The adhesive of claim 8 wherein the monomer is butyl acrylate or 2-ethylhexyl acrylate.

10. The adhesive of claim 1 wherein a minor portion of the solids of the discontinuous phase comprises a vinyl polymerizable monomer selected from the group consisting of the esters of acrylic or methacrylic acid with $C_1$-$C_{18}$ alcohols; acrylamide or methacrylamide or their corresponding N-substituted derivatives; vinyl ethers; N-vinyl lactans; halogenated vinyl compounds; alkyl vinyl ketones; diesters and polyalkylene glycol acrylates or methacrylates.

11. The adhesive of claim 1 wherein less than 2% by weight of the solids of the discontinuous phase comprises a multifunctional monomer selected from the group consisting of diallyl maleate, triallyl cyanurate, tetraethylene glycol dimethacrylate, and hexa-allyl sucrose.

12. The adhesive of claim 1 which is formulated as a pressure sensitive and is prepared with a polymeric colloid having a Tg of −40° to −20° C.

13. The adhesive of claim 1 which is formulated as a laminating adhesive and is prepared using a polymeric colloid having a Tg of −25° to −10° C.

14. Pressure sensitive coatings formed with the adhesive of claim 12.

15. Laminates formed with the adhesive of claim 13.

* * * * *